Feb. 16, 1937. T. W. FRECH 2,071,201
WORKSHOP UNIT
Filed Aug. 10, 1933   2 Sheets-Sheet 1
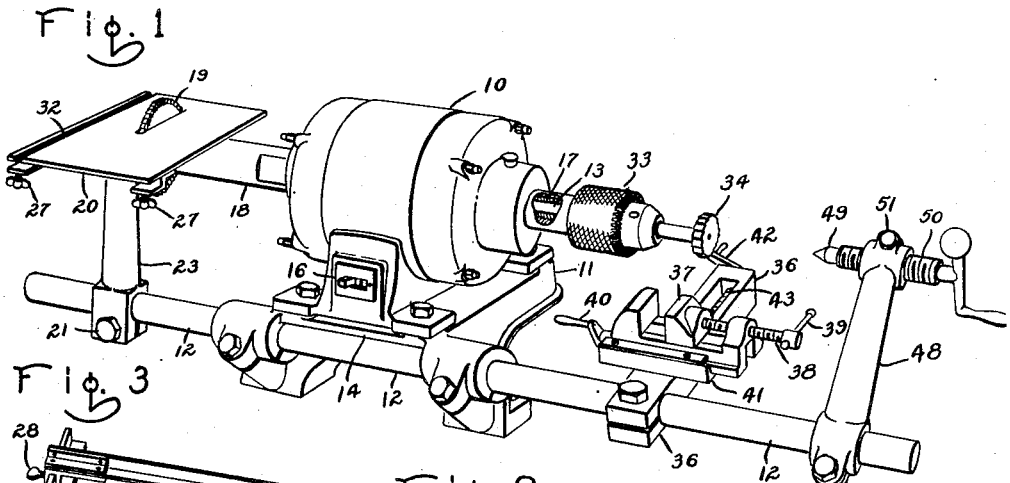
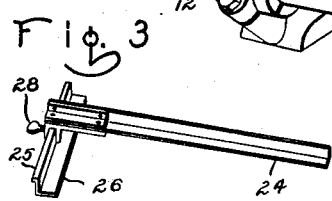
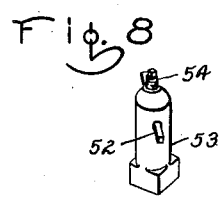
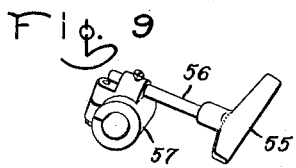
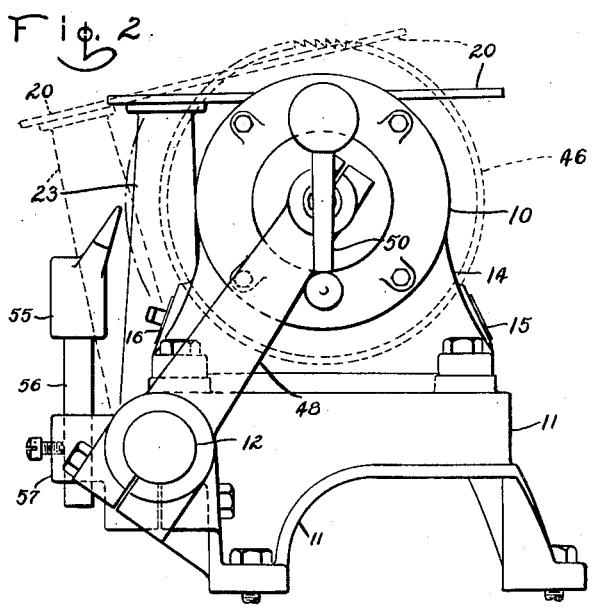
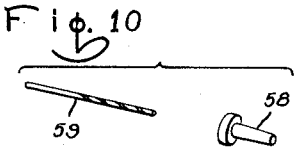
INVENTOR:
THEODORE W. FRECH,
BY Harry E. Dunham
HIS ATTORNEY.

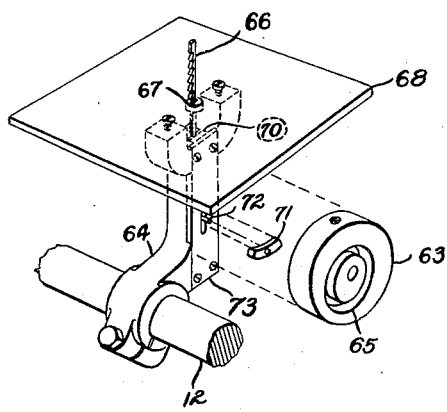
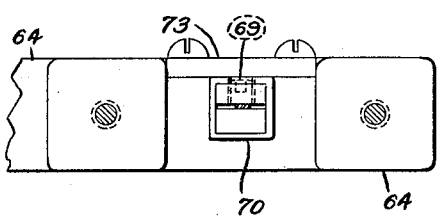
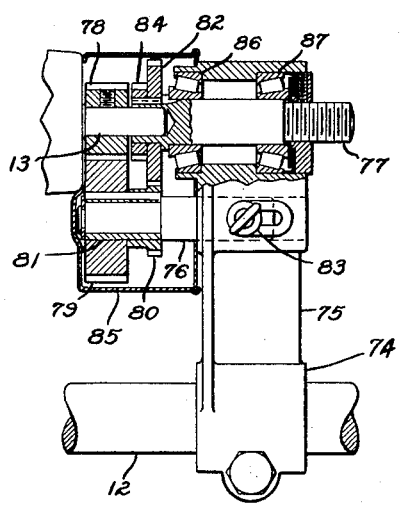
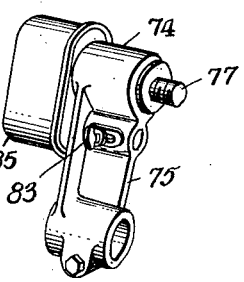

Patented Feb. 16, 1937

2,071,201

UNITED STATES PATENT OFFICE 2,071,201

WORKSHOP UNIT

Theodore W. Frech, Shaker Heights, Ohio, assignor to General Electric Company, a corporation of New York Application August 10, 1933, Serial No. 684,524

7 Claims. (Cl. 29—27)

My invention relates to machines for cutting, shaping and finishing wood, metal and the like, and more particularly to a combination with a driving motor of various apparatus and tools capable of drilling, grinding, sawing, milling and other operations so as to constitute a convenient and compact workshop unit. For certain factory operations and particularly for home workshop use, it is desirable to have a simple, compact and inexpensive electric motor driven machine unit of this type which can be equipped, with the exchange of a few parts, to perform a great variety of operations. It is desirable that the change over from one set of tools and attachments to another be easily and quickly made and that a sturdy and easily operated assembly be provided in each case.

According to my invention, the "live" members of the unit are mounted directly on an end of the motor shaft and the "dead" members on a rod extending in the same general direction as, but offset vertically and horizontally from, the motor shaft. The "dead" members are mounted on the said rod independent of all other mechanism and may be adjusted to various positions by movement along or around said rod. A simple rotation of an attachment provides the necessary changes in position and thus takes the place of the more complicated means for securing vertical and horizontal positioning which have been characteristic of prior devices. Full flexibility of operation for each of the members is thereby provided and at no increase in cost. Another feature of my machine is the utilization of both ends of the motor shaft by extending them so that the "live" members may be mounted on either end and by extending the supporting rod for the "dead" members. Thus two complete working assemblies may be provided at the same time and therefore two different operations may be performed in sequence without interruption for an addition or substitution of parts. A quickly attachable speed changer may be provided to permit a slower or faster speed operation when desired. Other features and advantages of my invention will appear from the drawings and the detailed description which follows.

In the drawings, Fig. 1 is a perspective view of a machine comprising my invention; Fig. 2 is an end elevation thereof; Figs. 3 and 4 are perspective views of two types of saw table fences; Fig. 5 is a perspective view of a milling cutter and arbor; Fig. 6 shows a circular wood saw; Fig. 7 shows a grinding wheel; Fig. 8 is a perspective view of a tool post with a cutting tool mounted therein; Fig. 9 is a perspective view of a tool rest; Fig. 10 shows a drill and a spindle adapted to be used in place of the dead center on a machine; Fig. 11 is a perspective view of a speed changer, and Fig. 12 is an elevation thereof partly in section; Fig. 13 is a perspective view of a saber saw attachment; and Fig. 14 is a plan view of a portion of the saber saw bracket.

The machine of my invention consists of a basic unit which comprises an electric motor 10 (Figs. 1 and 2) bolted to a three-legged bed plate 11 and a rod 12 mounted parallel to the motor armature shaft 13 and extending some distance beyond the ends thereof. The motor base 14 provides for electrical connection to said motor through a standard plug 15 mounted in one side thereof and an electrical switch 16 mounted in the other side. The rod 12 is mounted in the fore part of the motor bed plate 11 and specifically below and to the front of the motor shaft. Both ends of the motor shaft 13 protrude and each end has a sleeve 17 attached thereto which is threaded so as to fit with the standard tools and attachments of milling and boring machines, and the like. In the particular instance illustrated, the machine is fitted up for metal sawing and milling. The left end which is equipped for sawing has an arbor 18 holding a circular metal saw 19 attached to the sleeve on that end of the motor shaft and attached to rod 12 is a table 20. The saw protrudes through an aperture in the table which can be raised and lowered by rotation thereof relatively to rod 12 to determine the depth of cut. The adjustment of the table is made after loosening bolt 21 as the end of arm 23 is slotted but not keyed to rod 12. If a longitudinal guide is desired the fence 24 shown in Fig. 3 may be attached to the table by placing bracket 25 against the end of the table and the flange 26 thereon between screws 27 and the table. The guide or fence portion 24 may be slid on bracket 25 as desired and locked in place by tightening screw 28. A guide for angular cutting is provided in fence 29 (Fig. 4) which is pivotally attached to slide 30 and can be adjusted to the angle desired by loosening screw 31. Slide 30 fits into the longitudinal groove 32 in the table and is free to slide therein.

The right end of the machine which is equipped for milling has a standard chuck 33 threaded onto the sleeve 17 of the motor shaft and has a spindled milling cutter 34 held therein. The piece to be milled is held in vise 35 which is mounted indirectly on bracket 36 which in turn is mounted on rod 12. The vise consists of a fixed jaw 35 and a movable jaw 37, the latter adjusted through screw 38 and lever 39, and can be moved both longitudinally and crosswise. Longitudinal feed is produced by turning crank 40 which moves the vise in carriage 41 by turning a screw not shown and cross feed is produced by turning crank 42 which moves the carriage 41 along bracket 36 through movement of screw 43. Vertical adjustment of the vise is produced by swinging bracket 36 on rod 12. Although a tail stock is shown mounted on rod 12, it is not used with this set-up. If it is desired to use a cutter not equipped with a spindle as shown at 44 in Fig. 5, the arbor 45 can be fitted into chuck 33 and the cutter held in it.

To outfit the machine for wood sawing, the metal saw 19 is replaced by the circular wood saw 46 (Fig. 6) as indicated in the dotted lines of Fig. 2. With a larger saw of this type, the table must be tilted so that too much of the saw does not protrude through said table. To grind, the grinding wheel 47 (Fig. 7) can be placed on the arbor on the left end of the machine. To turn metal, a tail stock 48 is placed on rod 12 as shown and the metal piece is mounted between the chuck 33 and the point of dead center 49. Adjustment of the dead center can either be made by moving the position of the tail stock on rod 12 or by turning tail spindle 50 in the tail stock and clamping. Screw 51 permits the spindle to be clamped in position. The cutting tool 52 (Fig. 8) is held in tool post 53 which is mounted in vise 35 and is moved by changing the position of the vise as previously described. The tool 52 is clamped within the post by screw 54. For wood turning, this type of tool need not be used as a tool rest 55 (Figs. 2 and 9) which fits on rod 12 is provided. With this rest the usual wood turning tools can be used. Vertical adjustment of the rest is made through movement of rod 56 in holder 57. To drill, the work is placed against spindle 58 (Fig. 10) which takes the place of dead center 49 and the tail spindle 50 is turned to feed the work piece to the drill 59 (Fig. 10) which is substituted for the milling cutter 34.

With certain types of work, such as milling and drilling, the speed of the motor is excessive and more power is required. In such cases a speed reducer such as shown at 74 in Figs. 11 and 12 is used. In this instance a reduction of 3 to 1 or 1 to 1 is used and the power take-off is directly in line with the motor shaft. The speed reducer consists of the bracket 75 which is mounted on rod 12 and supports the intermediate gear shaft 76 and the take-off shaft 77. The drive for the slowest speed is through gear 78 on the motor shaft 13 to gears 79 and 80 which are keyed on sleeve 81 on shaft 76 and to gear 82 which is keyed to shaft 77. When no reduction is desired, screw 83 is loosened and pushed to the right causing shaft 76 to shift. When so shifted, gear 80 slips out of mesh with gear 82 and gear 79 meshes with gears 78 and 84. The gears are enclosed by housing 85 and shaft 77 rides in roller bearings 86 and 87 in bracket 75. Should it be desired to use the machine for other purposes with other attachments, these may be added, the stationary or "dead" members may be mounted on the shaft 12 and the operating or "live" members to the ends of the motor shaft.

Another type unit which may be applied to the basic unit consists of the saber saw shown in Figs. 13 and 14. In this case a cam 63 is fastened to the motor shaft and the unit consisting principally of bracket 64 is mounted on rod 12. The cam 63 is of box or face design and has oppositely disposed ways 65 on either side so as to be in balance. The saw 66 operates vertically in guide 67 in table 68 and is attached by means of a headless set screw 69 (Fig. 14) to slide 70. Vertical motion is produced in the slide by shoe 71 which rides in the ways of cam 63 and which is connected to the slide by pin 72. Plate 73 retains the slide within its ways in bracket 64. In order that vibration be reduced to a minimum, the slide is cut away as much as possible.

What I claim as new and desire to secure by Letters Patent of the United States is:

1. A workshop unit comprising a bed plate, an electric motor mounted on said bed plate and having a shaft, a rod for supporting various attachments rigidly mounted in said bed plate independently of the said motor and extending therefrom in a direction substantially parallel to the said motor shaft, said rod being located below and to one side of said motor shaft.

2. A workshop unit comprising a bed plate, an electric motor mounted on said bed plate having a driven shaft protruding beyond the housing thereof, a rod carried by said bed plate independently of said motor for supporting various attachments and extending in the same general direction as said motor shaft but offset vertically and horizontally therefrom, and a quickly attachable speed changer mounted on said rod and in engagement with the end of said motor shaft.

3. A workshop unit comprising the combination of a bed plate, an electric motor mounted on said bed plate and having a driven shaft, a tool, means for attaching said tool to the end of said motor shaft, a rod rigidly mounted in said bed plate independently of said motor and extending in the same general direction as said motor shaft but vertically and horizontally offset therefrom and means slidably and pivotally mounted on said rod for holding a workpiece in operative relation to said tool.

4. A workshop unit comprising the combination of a bed plate, an electric motor having a driven shaft, a plurality of tools, means for attaching said tools to both ends of said motor shaft, a rod rigidly mounted on said bed plate independently of said motor and extending in the same general direction as said motor shaft but vertically and horizontally offset therefrom and means slidably and pivotally mounted on said rod for holding a workpiece in operative relation to each of said tools.

5. A workshop unit comprising in combination a bed plate, a head stock including an electric motor mounted on said bed plate and having a shaft, a support rod rigidly mounted in said bed plate independently of said motor and extending therefrom in a direction substantially parallel to the said motor shaft, said support rod being located below and to one side of said motor shaft, a tail stock having a dead center and being slidably and pivotally mounted on said support rod, and a tool holder slidably and pivotally mounted on said support rod.

6. A workshop unit comprising in combination a bed plate, an electric motor mounted on said bed plate and having a substantially horizontal shaft, a face cam on an end of said shaft, a bracket mounted on said bed plate, a substantially vertically disposed slide mounted in said bracket, a saw attached at its lower end to the upper end of said slide, a table mounted on the upper end of said bracket and having an aperture therein to allow the reciprocation of said saw therethrough and a guide mounted in said aperture for holding the upper end of said saw in position, said slide having a shoe thereon engaging the track in the face of said cam for reciprocating said slide and the saw attached thereto.

7. A workshop unit comprising in combination a bed plate, an electric motor mounted on said bed plate and having a substantially horizontal shaft, a circular saw mounted on an end of said shaft, a support rod rigidly mounted in said bed plate independently of said motor and extending therefrom in a direction substantially parallel to the said motor shaft, said support rod being located below and to one side of said motor shaft, an upwardly extending arm pivotally mounted on said support rod, and a table mounted on the upper end of said rod and having a slot therein through which a portion of said circular saw protrudes, said table being adapted to be moved relative to said circular saw by pivotal adjustment of said arm on said rod to vary the extent to which said saw protrudes above the surface of said table.

THEODORE W. FRECH.